(12) United States Patent
Bennett et al.

(10) Patent No.: US 8,151,264 B2
(45) Date of Patent: Apr. 3, 2012

(54) INJECTING VIRTUALIZATION EVENTS IN A LAYERED VIRTUALIZATION ARCHITECTURE

(75) Inventors: Steven M. Bennett, Hillsboro, OR (US); Andrew V. Anderson, Hillsboro, OR (US); Gilbert Neiger, Portland, OR (US); Dion Rodgers, Hillsboro, OR (US); Barry E. Huntley, Hillsboro, OR (US); Lawrence O. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1313 days.

(21) Appl. No.: 11/771,806

(22) Filed: Jun. 29, 2007

(65) Prior Publication Data

US 2009/0007103 A1 Jan. 1, 2009

(51) Int. Cl.
G06F 9/455 (2006.01)
(52) U.S. Cl. .......................................................... 718/1
(58) Field of Classification Search ........................ 718/1
See application file for complete search history.

(56) References Cited

U.S. PATENT DOCUMENTS

| | | | | |
|---|---|---|---|---|
| 4,253,145 A | * | 2/1981 | Goldberg | 703/21 |
| 2005/0060703 A1 | * | 3/2005 | Bennett et al. | 718/1 |
| 2005/0080965 A1 | * | 4/2005 | Bennett et al. | 710/200 |
| 2005/0240819 A1 | * | 10/2005 | Bennett et al. | 714/34 |
| 2006/0005084 A1 | * | 1/2006 | Neiger et al. | 714/47 |
| 2006/0015869 A1 | * | 1/2006 | Neiger et al. | 718/1 |
| 2006/0130060 A1 | * | 6/2006 | Anderson et al. | 718/1 |
| 2006/0206892 A1 | * | 9/2006 | Vega et al. | 718/1 |
| 2007/0028238 A1 | * | 2/2007 | Bennett et al. | 718/1 |
| 2007/0050764 A1 | * | 3/2007 | Traut | 718/1 |

FOREIGN PATENT DOCUMENTS

JP 2007-035045 A 2/2007

OTHER PUBLICATIONS

Office Action received for Japanese Patent Application No. 2008-169354, mailed on Nov. 26, 2010, 3 pages of English Translation and 5 pages of Office Action.
Office Action received for Japanese Patent Application No. 2008-169354, mailed on May 24, 2011, 6 pages of Japanese Office Action including 2 pages of English Translation.
Office Action received for Chinese Patent Application No. 200810136012.1, mailed on Mar. 4, 2011, 11 pages of English Translation and 5 pages of Office Action.

* cited by examiner

Primary Examiner — Diem Cao
(74) Attorney, Agent, or Firm — Trop, Pruner & Hu, P.C.

(57) ABSTRACT

Embodiments of apparatuses, methods, and systems for injecting virtualization events in a layered virtualization architecture are disclosed. In one embodiment, an apparatus includes virtual machine entry logic, recognition logic, and evaluation logic. The virtual machine entry logic is to initiate a transfer of control of the apparatus from a host to a guest running on a virtual machine. The recognition logic is to recognize a request from the host to inject a virtualization event into the virtual machine. The evaluation logic is to identify an intervening monitor to handle the virtualization event.

14 Claims, 3 Drawing Sheets

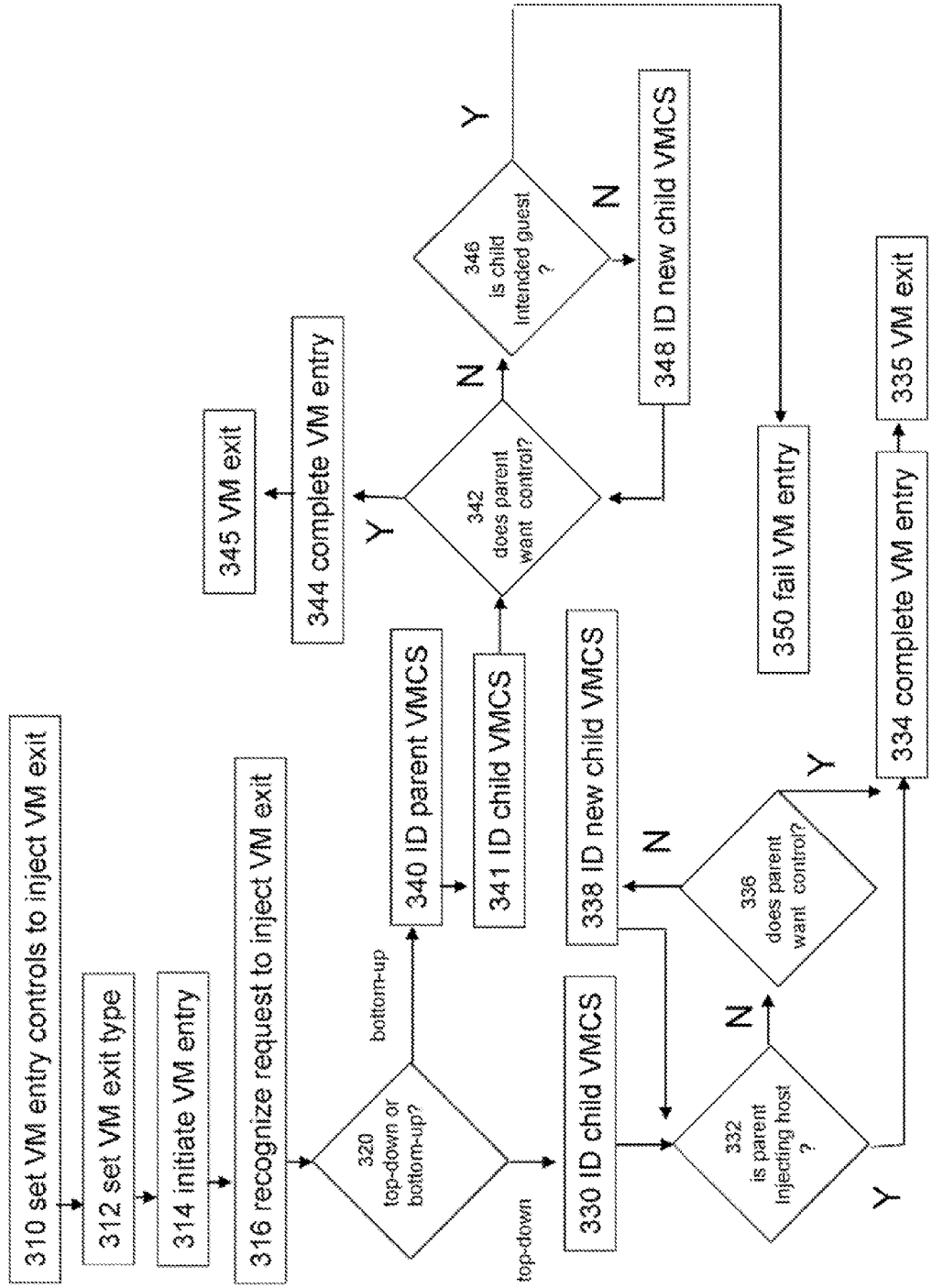

INJECTING VIRTUALIZATION EVENTS IN A LAYERED VIRTUALIZATION ARCHITECTURE

BACKGROUND

1. Field

The present disclosure pertains to the field of information processing, and more particularly, to the field of platform virtualization.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" (a "VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A processor in a data processing apparatus may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

FIG. 3 illustrates a method for injecting virtualization events according to an embodiment of the present invention.

DETAILED DESCRIPTION

Embodiments of apparatuses and methods for injecting virtualization events in a layered virtualization environment are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Figure 1:
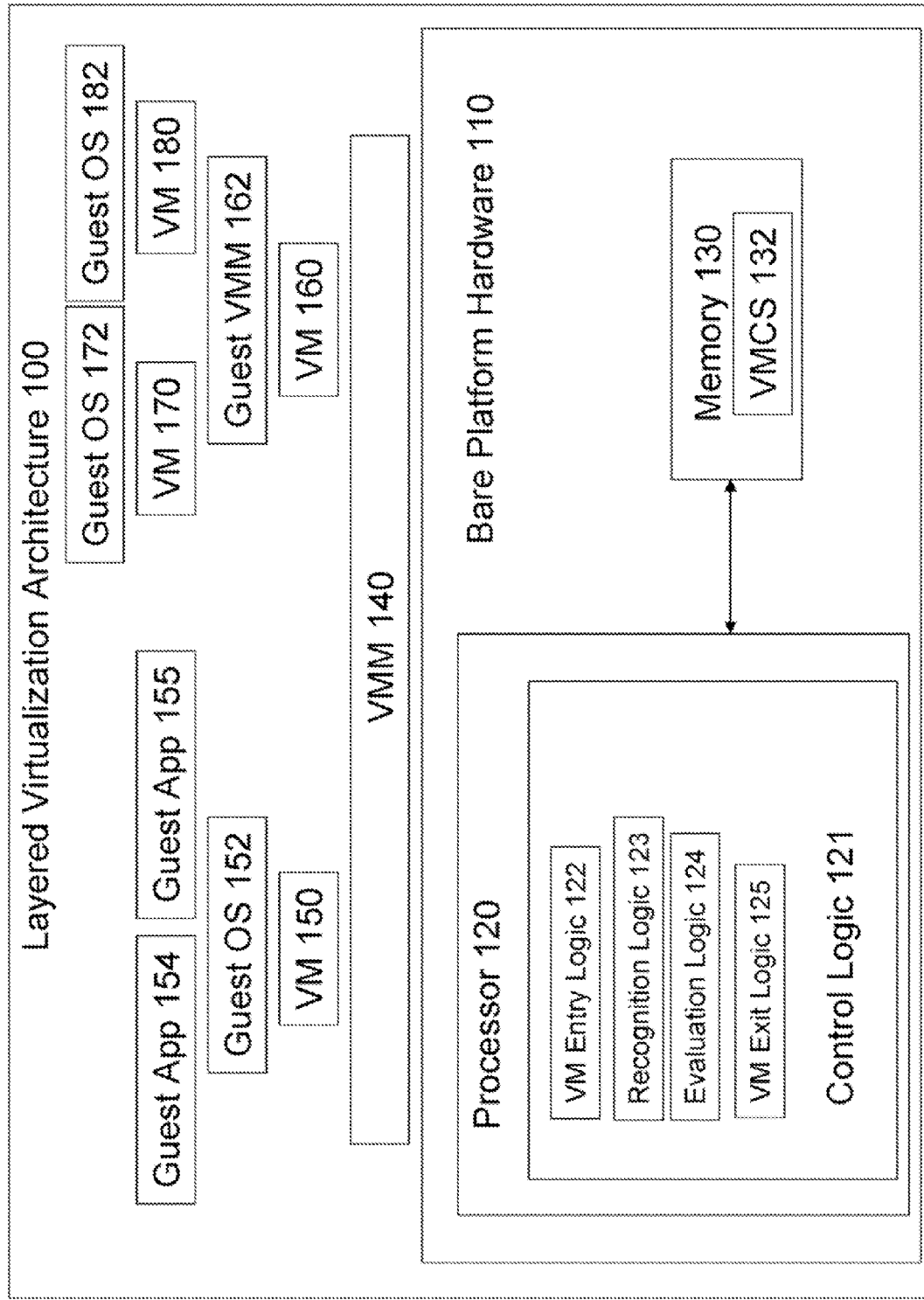
FIG. 1 illustrates a layered virtualization architecture in which an embodiment of the present invention may operate.

FIG. 1 illustrates layered virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, server, portable computer, handheld device, set-top box, or any other computing system. Bare platform hardware 110 includes processor 120, memory 130, input/output ("I/O") device 111, and chipset 112.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors. Processor 120 may include multiple threads or multiple cores in any combination.

Memory 130 may be static or dynamic random access memory, semiconductor-based read only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150, 160, 170, and 180, and a number of guests.

VMM 140 may be any software, firmware, or hardware host installed to run on, or accessible to, bare platform hardware 110, to present VMs, i.e., abstractions of bare platform hardware 110, to guests, or to otherwise create VMs, manage VMs, and implement virtualization policies within a virtualization environment supported by virtualization architecture 100. In this embodiment, VMM 140 is a "root, mode host" because it runs in root mode on processor 120. In other embodiments, a root mode host may be any monitor, hypervisor, OS, or other software, firmware, or hardware capable of controlling bare platform hardware 110.

A guest may be any OS, any VMM, including another instance of VMM 140, any hypervisor, or any application or other software. Each guest expects to access physical resources, such as processor and platform registers, memory, and I/O devices, of bare platform hardware 110, according to the architecture of the processor and the platform presented in the VM. FIG. 1 shows VMs 150, 160, 170, and 180, with guest OS 152 and guest, applications 154 and 155 installed to run on VM 150, guest VMM 162 installed to run on VM 160, guest OS 172 installed to run on VM 170, and guest OS 182 installed to run on VM 180. In this embodiment, all guests run in non-root mode. Although FIG. 1 shows four VMs, three guest OSs and two guest applications, any number of VMs may be created and any number of guest OSs and applications may be installed to run on each VM within the scope of the present invention.

Virtualization architecture 100 is "layered" or "recursive-" because it allows one VMM, for example, VMM 140, to host another VMM, for example, VMM 162, as a guest. In layered virtualization architecture 100, VMM 140 is the host of the virtualization environment including VMs 150 and 160, and is not a guest in any virtualization environment because it is installed to run on bare platform hardware 110 with no "intervening" monitor between it and bare platform hardware 110. An "intervening" monitor is a monitor, such as VMM 162, that hosts a guest, such as guest OS 172, but is also a guest itself. VMM 162 is the host of the virtualization environment including VMs 170 and 180, but is also a guest in the virtualization environment hosted by VMM 140. An intervening monitor (e.g., VMM 1.62) is referred to herein as a parent guest, because it may function as both a parent to another VM (or hierarchy of VMs) and as a guest of an underlying VMM (e.g., VMM 140 is a parent of VMM 162 which is a parent to guests 172 and 182).

A monitor, such as VMM 140, is referred to as the "parent" of a guest, such as OS 152, guest application 154, guest application 155, and guest VMM 162, if there are no intervening monitors between it and the guest. The guest is referred to as the "child" of that monitor. A guest may be both a child and a parent. For example, guest VMM 162 is a child of VMM 140 and the parent of guest OS 172 and guest OS 182.

A resource that can be accessed by a guest may either be classified as a "privileged" or a "non-privileged" resource. For a privileged resource, a host (e.g., VMM 140) facilitates the functionality desired by the guest while retaining ultimate control over the resource. Non-privileged resources do not need to be controlled by the host and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by a host to ensure proper operation of VMs, protection of the host from guests, and protection of guests from each other.

At any given time, processor 120 may be executing instructions from VMM 140 or any guest, thus VMM 140 or the guest may be active and running on, or in control of, processor 120. When a privileged event occurs or a guest attempts to access a privileged resource, control may be transferred from the guest to VMM 140. The transfer of control from a guest to a host is referred to as a "VM exit" herein. After handling the event or facilitating the access to the resource appropriately, VMM 140 may return control to a guest. The transfer of control from a host to a guest is referred to as a "VM entry" herein.

In addition to a VM exit transferring control from a guest to a root mode host, as described above, embodiments of the present invention also provide for a VM exit to transfer control from a guest to a non-root mode host, such as an intervening monitor. In embodiments of the present invention, virtualization events (i.e., anything that may cause a VM exit) may be classified as "top-down" or "bottom-up" virtualization events.

A "top-down" virtualization event is one in which the determination of which host receives control in a VM exit is performed by starting with the parent of the active guest and proceeds towards the root mode host. Top-down virtualization events may be virtualization events that originate through actions of the active guest, including the execution of virtualized instructions such as the CPUID instruction in the instruction set architecture of a processor in the Pentium® Processor Family. In one embodiment, a host may be provided with the ability to bypass top-down virtualization event processing for one or more virtualization events.

A "bottom-up" virtualization event is one in which the determination of which host receives control in a VM exit is performed in the opposite direction, e.g., from the root mode host towards the parent of the active guest. Bottom-up virtualization events may be virtualization events that originate by actions of the underlying platform, e.g., hardware interrupts and system management interrupts, or that model events of the underlying platform, e.g., injected virtual interrupts. In one embodiment, processor exceptions are treated as bottom-up virtualization events. For example, the occurrence of a page fault exception during execution of an active guest would be evaluated in a bottom-up fashion. This bottom-up processing may apply to all processor exceptions or a subset thereof.

In the embodiment of FIG. 1, processor 120 controls the operation of VMs according to data stored in virtual machine control structure ("VMCS") 132. VMCS 132 is a structure that, may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130, VMCS 132 may be divided into multiple structures, each corresponding to one host or one guest, where each may be considered an independent VMCS.

The "guest hierarchy" of a VMM is the stack of software installed to run within the virtualization environment or environments supported by the VMM. The present invention may be embodied in a virtualization architecture in which guest hierarchies include chains of pointers between VMCSs. These pointers are referred to as "parent pointers" when pointing from the VMCS of a child to the VMCS of a parent, and as "child pointers" when pointing from the VMCS of a parent to the VMCS of a child. In the guest hierarchy of a VMM, there may be one or more intervening monitors between the VMM and the active guest. An intervening monitor that is closer to the VMM whose guest hierarchy is being considered is referred to as "lower" than an intervening monitor that is relatively closer to the active guest.

Figure 2:
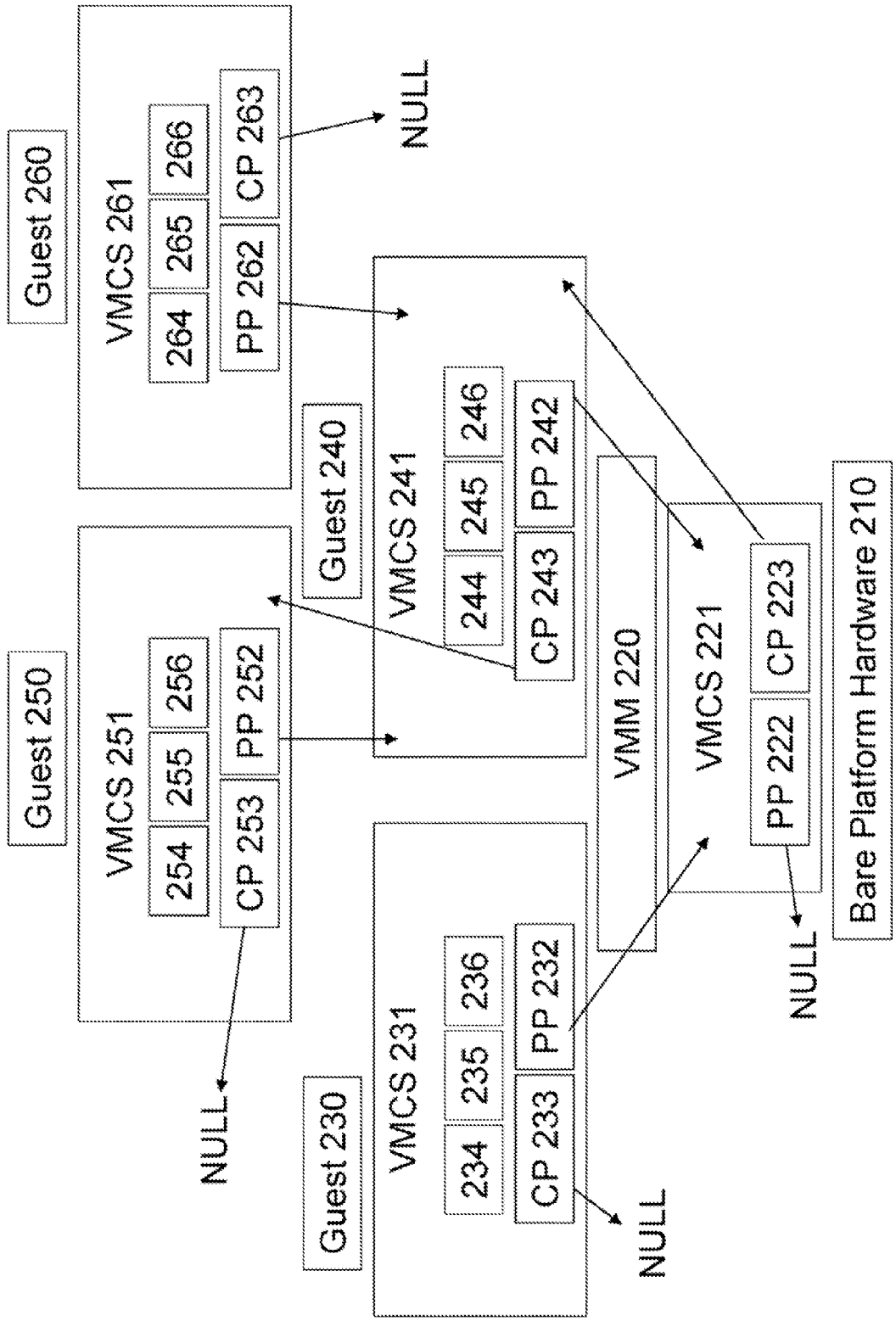
FIG. 2 illustrates the guest hierarchy of a VMM in a layered virtualization architecture.

FIG. 2 illustrates the guest hierarchy of VMM 220, which is installed as a root mode host on bare platform hardware 210, VMCS 221 is a control structure for VMM 220, although a root mode host may operate without a control structure. Guest 230 is a child of VMM 220, controlled by VMCS 231. Therefore, parent pointer ("PP") 232 points to VMCS 221. Guest 240 is also a child of VMM 220, controlled by VMCS 241. Therefore, parent pointer 242 also points to VMCS 221.

Guest 240 is itself a VMM, with two children, guests 250 and 260, each with a VMCS, 251 and 261, respectively. Both parent pointer 252 and parent pointer 262 point to VMCS 241.

The VMCS of a guest that is active, or running, is pointed to by the child pointer of its parent's VMCS. Therefore, FIG. 2 shows child pointer 243 pointing to VMCS 251 to indicate that guest 250 is active. Similarly, the VMCS of a guest with an active child pointer, as opposed to a null child pointer, is pointed to by the child pointer of its parent's VMCS. Therefore, FIG. 2 shows child pointer 223 pointing to VMCS 241. Consequently, a chain of parent pointers links the VMCS of an active guest through the VMCSs of any intervening monitors to the VMCS of a root mode host, and a chain of child pointers links the VMCS of a root mode host through the VMCSs of any intervening monitors to the VMCS of an active guest.

The VMCS 221 is referred to herein as the "root VMCS". In an embodiment, there is no root VMCS, as described above. In an embodiment which includes a root VMCS, the processing hardware may maintain a pointer to the root VMCS in an internal register or other data structure. The VMCS of a guest that is active, as described above, is referred to herein as the current controlling VMCS, For example, while guest 250 is active, VMCS 251 is the current controlling VMCS. In an embodiment, the processing hardware may maintain a pointer to the current controlling VMCS in an internal register or other data structure.

If a VMCS is not a parent VMCS, its child pointer, such as child pointers 233, 253, and 263, may be a null pointer. If a VMCS does not have a parent, for example, if it is a root-mode VMCS, its parent pointer, such as parent, pointer 222, may be a null pointer. Alternatively, these pointers may be omitted. In some embodiments, the "null" value for a null VMCS pointer may be zero. In other embodiments, other values may be interpreted as "null". For example, in one embodiment with 32-bit addresses, the value 0xffffffff may be interpreted as null.

Each guest's VMCS in FIG. 2 includes a number of storage locations for information related to the injection of virtualization events. These storage locations may be fields, bits, or arranged in any other information storage space format.

For example, VM exit control fields 234, 244, 254, and 264 include a number of event bits, and may include an event bit corresponding to each possible virtualization event. Each event bit indicates whether that guest's parent wants control if the corresponding virtualization event occurs.

VM entry control fields 235, 245, 255, and 265 each include indicators to control the injection of virtualization events. In this embodiment, these are 32-bit fields that are also used to control the injection of interrupts. Bit 31 is a valid bit to that may be set to indicate that an interrupt or other event is to be injected. Bits 10:8 are used to identify the type of interrupt or other event to be injected, where the value "001" means inject a VM exit. Other embodiments may have a different format for this field or may encode this information in multiple fields.

VM exit information fields 236, 246, 256, and 266 include an exit-reason field that may be used to indicate the reason for a VM exit, to help the VMM that receives control to determine how to handle the VM exit. In this embodiment, the exit-reason fields are also used to indicate the type of VM exit to be injected when the VM entry controls described above are used to inject a VM exit. The same codes may be used for the injection of VM exits as are used for the reasons for VM exits. In other embodiments, the encoding used for the injection of VM exits may differ from the encoding used for the reasons for VM exits. In other embodiments, a new field may be added to the VMCS to indicate the type of VM exit to be injected The foregoing descriptions are of particular bits and fields to illustrate one embodiment. In other embodiments, each VMCS may include any number of such bits or other storage spaces corresponding to the desired control indicators.

Returning to FIG. 1, processor 120 includes control logic 121 to support virtualization, including injecting virtualization events in a layered virtualization architecture. Control logic 121 may be implemented in microcode, programmable logic, hard-coded logic, or any other form of control logic within processor 120. In other embodiments, control logic 121 may be implemented in any form of hardware, software, or firmware, such as a processor abstraction layer, within a processor or within any device accessible or medium readable by a processor, such as memory 130.

Control logic 121 includes VM entry logic 122, recognition logic 123, evaluation logic 124, and exit logic 125. VM entry logic 122 is to prepare for and cause a VM entry. Recognition logic 123 is to recognize requests to inject virtualization events. Evaluation logic 124 is to identify an intervening monitor to handle the virtualization event. VM exit logic 125 is to prepare for and cause a VM exit. Each of these logic units may also perform additional functions, including those described as being performed by another of the logic units, and any or all of these logic units may be integrated into a single logic unit.

Control logic 121 causes processor 120 to execute method embodiments of the present invention, such as the method embodiment illustrated in FIG. 3, for example, by causing processor 120 to include the execution of one or more micro-operations, e.g., to support virtualization, in its response to virtualization instructions, other instructions from a host or guest, or virtualization events.

FIG. 3 illustrates method 300 for injecting virtualization events according to an embodiment of the present invention. Although method embodiments are not limited in this respect, reference is made to the platform of FIGS. 1 and 2 to describe the method embodiment of FIG. 3.

In box 310, an active host VMM stores values in a VM entry control field in the VMCS of an inactive guest (the "guest VMCS") to indicate that a VM exit is to be injected into the virtual machine on which the guest will run. In box 312, the host VMM stores a value in the exit-reason field in the guest VMCS to indicate the type of VM exit to be injected. In box 314, a VM entry into that VM is initiated. In box 316, recognition logic 123 recognizes the request to inject the VM exit, for example, by reading the VM entry control field from the guest VMCS.

In box 320, evaluation logic 124 determines whether the injected event is a top-down event or a bottom-up event, for example, by reading the exit-reason from the guest VMCS. If the event is top-down, method 300 continues in box 330. If the event is bottom-up, method 300 continues in box 340.

In boxes 330 to 338, evaluation logic 124 determines if an intervening monitor is to handle the top-down event, and if so, identifies that intervening monitor.

In box 330, the guest VMCS is identified as the child VMCS. In box 332, a determination is made as to whether the parent of that child is the host that injected the event. If it is, then, in this embodiment, in box 334, entry logic 122 completes the VM entry, and in box 335, exit logic 125 causes an immediate VM exit to occur and control is transferred to that parent. In another embodiment, the VM entry that was initiated in box 314 is failed or aborted, i.e., the VM entry is not completed and control remains with the host that attempted to inject the event.

Returning to box 332, if the determination is that, the parent is not the host that injected the event, then, in box 336, a determination is made as to whether that parent wants control, for example, by checking the child VMCS to determine if the event bit for the injected event is set. If it does, then, in box 334, entry logic 122 completes the VM entry, and in box 335, exit logic 125 causes a VM exit to occur and control is transferred to that parent. For example, if there is a VM exit after only one pass through box 336, then the immediate parent of the intended guest receives control. In some embodiments, some virtualization events may unconditionally cause a VM exit.

If the determination in box 336 is that the parent does not want control, then, in box 338, the parent pointer of the child VMCS is followed to identify the parent VMCS as the new child VMCS, replacing the last child VMCS. Then, box 332 is repeated.

In other embodiments, boxes 332 through 338 may be reordered, such that the determination of whether the parent wants control is performed for the host injecting the event. If it does not (e.g., the event bit in the VMCS is clear), then a failure of the VM entry may occur.

In boxes 340 to 348, evaluation logic 124 determines if an intervening monitor is to handle the bottom-up event, and if so, identifies that intervening monitor.

In box 340, the VMCS of the host that injected the event is identified as the parent VMCS. In box 341, the child pointer of the parent VMCS is followed to identify the child VMCS. In box 342, a determination is made as to whether the parent wants control, for example, by checking the child VMCS to determine if the event bit for the injected event is set. If it is, then, in box 344, entry logic 122 completes the VM entry, and in box 345, exit logic 125 causes a VM exit to occur and control is transferred to that, parent. In some embodiments, some virtualization events may unconditionally cause a VM exit.

If the determination in box 342 is that the parent does not want control, then, in box 346, a determination is made as to whether the child is the intended guest, for example, by determining if the child pointer of the child VMCS is a null pointer. If it is, then in box 350, the VM entry that was initiated in box 314 is failed or aborted, i.e., the VM entry is not completed and control remains with the host that attempted to inject the event. In another embodiment, the VM entry to the intended guest may be completed, followed by an immediate VM exit to the host attempting to inject the event. If the determination in box 346 is that the child is not the intended guest, then, in box 348, the child VMCS is identified as the new parent VMCS, replacing the last, parent VMCS. Then, box 342 is repeated.

Within the scope of the present invention, the method illustrated in FIG. 3 may be performed in a different order, performed with illustrated boxes omitted, performed with additional boxes added, or performed with a combination of reordered, omitted, or additional boxes.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a earner wave, embodying techniques of the present invention.

Thus, apparatuses and methods for injecting virtualization events in a layered virtualization architecture have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   virtual machine entry hardware to initiate a transfer of control of the apparatus from a host to a guest to be executed on a virtual machine;
   recognition hardware to recognize, before the transfer of control to the guest is completed, a request from the host to inject a virtualization event into the virtual machine;
   evaluation hardware to identify, before the transfer of control to the guest is completed, an intervening monitor to handle the virtualization event; and
   virtual machine exit hardware to transfer control of the apparatus to the intervening monitor after the transfer of control to the guest is completed;
   wherein the virtual machine entry hardware is to abort the transfer of control from the host to the guest if the evaluation hardware fails to identify the intervening monitor.

2. The apparatus of claim 1, wherein the recognition hardware is to recognize the request based on an indicator stored in a virtual machine control structure.

3. The apparatus of claim 1, wherein the evaluation hardware is also to determine the type of the virtualization event.

4. The apparatus of claim 3, wherein the evaluation hardware is also to determine the type of the virtualization event based on an indicator in a virtual machine control structure.

5. The apparatus of claim 3, wherein the evaluation hardware is to also determine whether to perform one of a top-down evaluation and a bottom-up evaluation based on the type of the virtualization event.

6. A method comprising:
  initiating a transfer of control of a processor from a host to a guest to be executed in a virtual machine;
  recognizing, before the transfer of control to the guest is completed, a request from the host to inject a virtualization event into the virtual machine;
  identifying, before the transfer of control to the guest is completed, an intervening monitor to handle the virtualization event;
  completing the transfer of control to the guest;
  transfer control of the apparatus to the intervening monitor after the transfer of control to the guest is completed; and
  aborting the transfer of control from the host to the guest if the identifying step fails to identify the intervening monitor.

7. The method of claim 6, wherein recognizing the request includes reading an indicator stored in a virtual machine control structure.

8. The method of claim 6, further comprising determining the type of the virtualization event.

9. The method of claim 8, wherein determining the type of the virtualization event includes reading an indicator stored in a virtual machine control structure.

10. The method of claim 6, further comprising determining whether to perform one of a top-down and a bottom-up evaluation.

11. A system comprising:
  a memory to store a control structure for a virtual machine; and
  a processor including
    virtual machine entry logic to initiate a transfer of control of the processor from a host to a guest to be executed on a virtual machine;
    recognition logic to recognize, before the transfer of control to the guest is completed, a request from the host to inject a virtualization event into the virtual machine;
    evaluation logic to identify, before the transfer of control to the guest is completed, an intervening monitor to handle the virtualization event; and
    virtual machine exit hardware to transfer control of the apparatus to the intervening monitor after the transfer of control to the guest is completed;
    wherein the virtual machine entry logic is to abort the transfer of control from the host to the guest if the evaluation hardware fails to identify the intervening monitor.

12. The system of claim 11, wherein the recognition logic is to recognize the request based on an indicator in the virtual machine control structure.

13. The system of claim 11, wherein the evaluation logic is also to determine the type of the virtualization event based on an indicator in the virtual machine control structure.

14. The system of claim 13, wherein the evaluation logic is also to determine whether to perform one of a top-down and a bottom-up evaluation based on the type of the virtualization event.

* * * * *